US008845429B2

(12) United States Patent
Garza et al.

(10) Patent No.: US 8,845,429 B2
(45) Date of Patent: Sep. 30, 2014

(54) INTERACTION HINT FOR INTERACTIVE VIDEO PRESENTATIONS

(75) Inventors: Enrique de la Garza, Sammamish, WA (US); Alexei Pineda, Bellevue, WA (US); Karen Woessner Smith, Kirkland, WA (US); Mike Lucero, Bellevue, WA (US); Shawn Prutsman, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 433 days.

(21) Appl. No.: 13/117,752

(22) Filed: May 27, 2011

(65) Prior Publication Data
US 2012/0302336 A1 Nov. 29, 2012

(51) Int. Cl.
*A63F 13/00* (2014.01)
*H04N 21/442* (2011.01)
*H04N 21/4788* (2011.01)
*H04N 21/475* (2011.01)
*H04N 21/858* (2011.01)

(52) U.S. Cl.
CPC ..... *H04N 21/44218* (2013.01); *H04N 21/4788* (2013.01); *H04N 21/4756* (2013.01); *H04N 21/8583* (2013.01)
USPC .............................................. 463/31; 463/36

(58) Field of Classification Search
USPC .................................................... 463/31, 36
See application file for complete search history.

(56) References Cited

U.S. PATENT DOCUMENTS

| 7,269,837 | B1 | | 9/2007 | Redling et al. |
| 7,996,869 | B2 | * | 8/2011 | Tu et al. ........................ 725/80 |
| 8,073,461 | B2 | * | 12/2011 | Altman et al. ............. 455/456.1 |
| 8,079,045 | B2 | * | 12/2011 | Krapf et al. ...................... 725/34 |
| 8,229,819 | B2 | * | 7/2012 | Ransom et al. ................. 705/35 |
| 2002/0019732 | A1 | | 2/2002 | Kikinis et al. |
| 2002/0104090 | A1 | | 8/2002 | Stettner |
| 2005/0289582 | A1 | * | 12/2005 | Tavares et al. .................. 725/10 |
| 2007/0106557 | A1 | * | 5/2007 | Varghese ....................... 705/14 |
| 2007/0214471 | A1 | * | 9/2007 | Rosenberg ...................... 725/24 |
| 2008/0046917 | A1 | | 2/2008 | de Heer |
| 2008/0276270 | A1 | * | 11/2008 | Kotaru et al. .................... 725/34 |
| 2009/0112656 | A1 | * | 4/2009 | Jung et al. ......................... 705/7 |
| 2009/0217324 | A1 | * | 8/2009 | Massimi ........................ 725/46 |
| 2009/0254946 | A1 | | 10/2009 | Vogel |
| 2010/0120531 | A1 | * | 5/2010 | Esaki et al. ...................... 463/35 |
| 2011/0106536 | A1 | * | 5/2011 | Klappert ........................ 704/246 |
| 2011/0134026 | A1 | * | 6/2011 | Kang et al. .................... 345/156 |
| 2011/0153414 | A1 | * | 6/2011 | Elvekrog et al. ............ 705/14.43 |
| 2012/0072939 | A1 | * | 3/2012 | Crenshaw ....................... 725/12 |
| 2012/0123811 | A1 | * | 5/2012 | Socolof ............................. 705/5 |
| 2012/0174032 | A1 | * | 7/2012 | Greene et al. ................. 715/811 |
| 2012/0265758 | A1 | * | 10/2012 | Han et al. ..................... 707/737 |
| 2012/0316962 | A1 | * | 12/2012 | Rathod ...................... 705/14.54 |

OTHER PUBLICATIONS

U.S. Appl. No. 61/428,769, filed Dec. 2010, Greene et al.*

(Continued)

*Primary Examiner* — Michael Cuff
(74) *Attorney, Agent, or Firm* — Micah Goldsmith; Leonard Smith; Micky Minhas

(57) ABSTRACT

An interaction hint is presented with a video segment. Upon receiving a user response to the interaction hint, a message is automatically sent to update information associated with a user profile without interrupting presentation of the video segment.

20 Claims, 4 Drawing Sheets

(56) References Cited

OTHER PUBLICATIONS

Lombard, et al., "Interactive Advertising and Presence: A Framework", Retrieved at << http://jiad.org/download?p=13>>, Journal of Interactive Advertising, vol. 1 No. 2, 2001, p. 56-65.

Li, Yi, "VoiceLink: A Speech Interface for Responsive Media", Retrieved at << http://web.media.mit.edu/~vmb/papers/lims.pdf >>, Sep. 2002, p. 1-66.

"V4x Launches VideoLive, Social TV App for Interaction along Webcasts", Retrieved at << http://www.v4x.com/press_releases/2010/pr_V4x_VideoLiveShow2010.pdf >>, Oct. 7, 2010, p. 1-2.

"Intelligent Interactive and Converged Advertising", Retrieved at << http://innovationzen.com/blog/2006/08/07/intelligent-interactive-and-converged-advertising/ >>, Retrieved Date: Mar. 29, 2011, pp. 4.

"LiveMedia Mobile TV and Video", Retrieved at << http://www.communology.com/fileadmin/pdf_brochures/brochure_communology_mobile_tv.pdf >>, Retrieved Date: Mar. 29, 2011, pp. 3.

"Clickable TV", Retrieved at << http://www.backchannelmedia.com/clickabletv/advertisers.html >>, Retrieved Date: Mar. 29, 2011, p. 1.

\* cited by examiner

INTERACTION HINT FOR INTERACTIVE VIDEO PRESENTATIONS

BACKGROUND

Media player devices including computing devices, mobile devices, cable television boxes, video game consoles, etc. may be used to present media content such as audio or video. Media content may be obtained by media player devices from local removable storage media or from remote sources via communication networks. Some media presentations may include advertising slots that are filled with advertisement segments. For example, the presentation of movies, television shows, or video games may be occasionally interrupted by video advertisement segments that provide viewers with a variety of information, including telephone numbers, web addresses, events, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Embodiments relating to interactive media presentations are disclosed. As one example, a video segment suitable for non-interactive playback is made interactive by presenting an interaction hint with the video segment. Responsive to a user response to the interactive hint, a remote computing device is automatically directed to update information associated with a user profile. The interactivity provided by the interactive hint is provided without interrupting presentation of the video segment.

DETAILED DESCRIPTION

An interaction hint is presented with a video segment. Upon receiving a user response to the interaction hint, a message is automatically sent to update information associated with a user profile without interrupting presentation of the video segment. The user profile may be updated to include information relating to the video segment presented with the interaction hint. The user profile may include any suitable information to be associated with a user, including, for example, social networking information such as online journal, blog, or micro-blog posts, contact lists (e.g., friends or groups), user favorites, user bookmarks, calendar information, email or short messaging service (SMS) communications (e.g., inbox and outbox), digital video recording (DVR) schedule information, etc. It is to be understood that these examples are nonlimiting and that virtually any information may be updated/communicated responsive to a user response to an interaction hint.

In some embodiments, the described methods and processes may be tied to a computing system including one or more computers. In particular, the methods and processes described herein may be implemented as a computer application, computer service, computer API, computer library, and/or other computer program.

Figure 1:
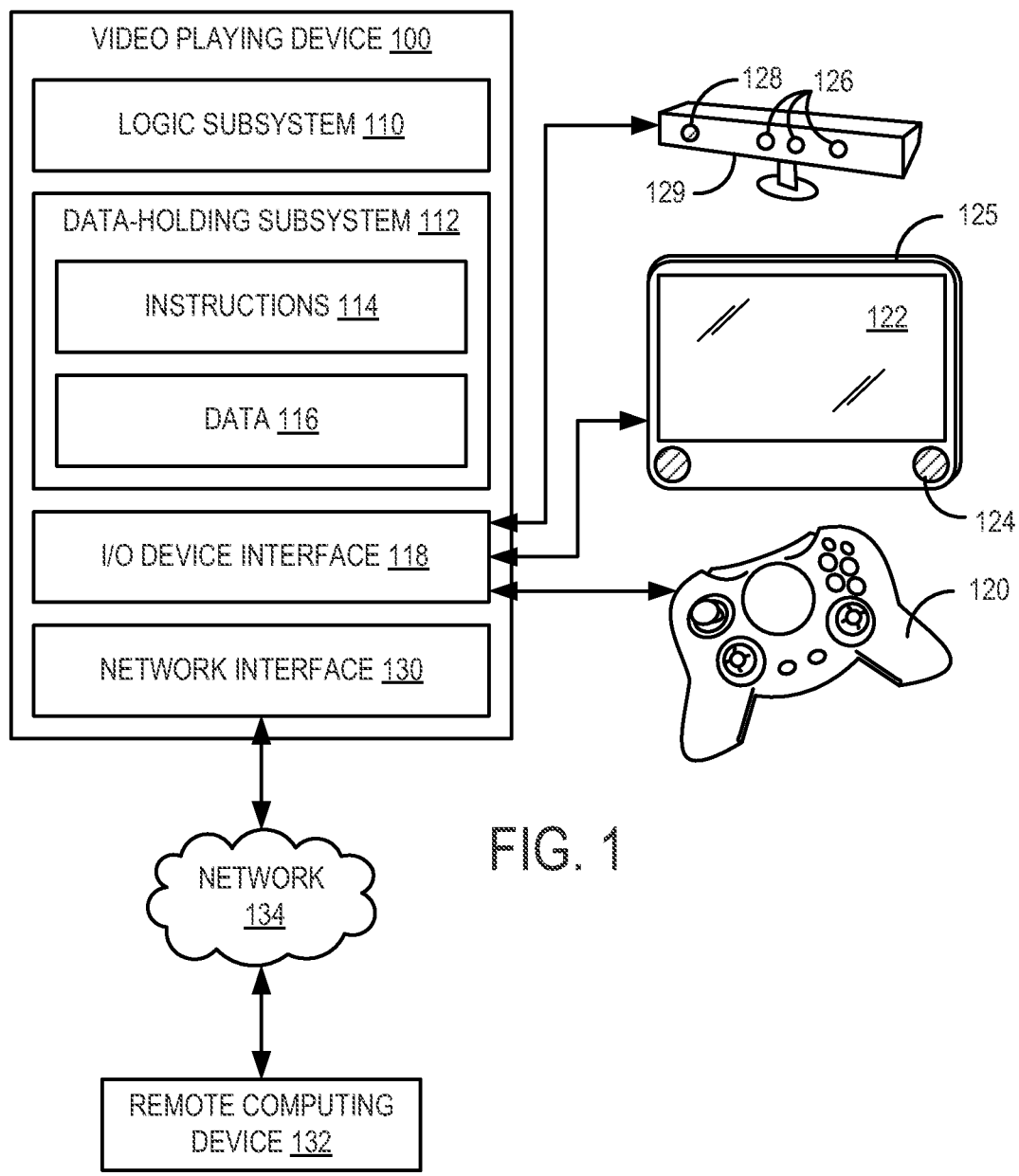
FIG. 1 is a schematic diagram depicting an example video playing device according to one disclosed embodiment.

FIG. 1 is a schematic diagram depicting an example video playing device 100 according to one disclosed embodiment. Video playing device 100 may be a computing system to perform one or more of the methods and processes described herein. Video playing device 100 is shown in simplified form. It is to be understood that virtually any computer architecture may be used without departing from the scope of this disclosure. In different embodiments, video playing device 100 may take the form of an Internet connected television, mainframe computer, server computer, desktop computer, laptop computer, tablet computer, home entertainment computer, network computing device, mobile computing device, mobile communication device, gaming device, etc.

Video playing device 100 includes a logic subsystem 110 and a data-holding subsystem 112. Logic subsystem 110 may include one or more physical devices configured to execute one or more instructions 114 of data-holding subsystem 112. For example, logic subsystem 110 may be configured to execute one or more instructions 114 that are part of one or more applications, services, programs, routines, libraries, objects, components, data structures, or other logical constructs. Such instructions may be implemented to perform a task, implement a data type, transform the state of one or more devices, or otherwise arrive at a desired result.

Video playing device 100 includes an input/output (I/O) device interface 118 to communicate with one or more input devices and/or output devices such as controller 120, display device 122, audio speaker 124, optical sensor system 126, and/or audio microphone 128. I/O device interface 118 may support or otherwise facilitate wired and/or wireless communications between video playing device 100, and one or more of these input devices and/or output devices.

Controller 120 may include or may take the form of a handheld video game controller, a computer mouse, a keyboard, a remote control, a mobile device such as a cellular telephone or tablet computer, a touch-screen interface device, or other suitable controller form factor. Display device 122 may include or take the form of a television, display monitor, projector, or touch-screen display device configured to receive user input. Optical sensor system 126 may include one or more optical sensors such as a visible light sensor, RGB sensor, infrared sensor, depth camera, and/or other suitable optical sensor or combination thereof.

One or more of these input devices and/or output devices may be combined into one or more common devices. As one example, display device 122 and audio speaker 124 may be combined into a common audio-visual system 125. As another example, audio microphone 128, and one or more optical sensors of optical sensor system 126 may be combined into a common sensor system 129. As a non-limiting example, sensor system 129 may refer to the KINECT™ product by Microsoft Corporation. KINECT™ is either a registered trademark or a trademark of Microsoft Corporation in the United States and/or other countries.

Video playing device 100 may include a network interface 130 to communicate with one or more remote computing devices such as remote computing device 132 via a communications network 134. In some embodiments, network interface 130 may allow or otherwise enable video playing device 100 to send and/or receive messages to and/or from other computing devices (e.g., remote computing device 132) via communications network 134. In some embodiments, remote computing device 132 may include or take the form of a network server or network server system, and communications network 134 may include or take the form of a wired and/or wireless wide area network such as the Internet or a portion thereof. In some embodiments, remote computing device 132 may include or take the form of a personal computing device or a mobile computing device, and communications network 134 may include or take the form of a wired and/or wireless local area network.

Instructions 114 of data-holding subsystem 112 may be executable by logic subsystem 110 to obtain a video segment for presentation. As one example, the video segment may include a video advertisement segment to be played during an advertising slot within a media presentation. As another example, the video segment may include some or all of a media presentation that may or may not include advertisement slots within which one or more other advertisement video segments may be presented.

In some embodiments, a video segment may be obtained from data 116 held or residing locally at data-holding subsystem 112. For example, data-holding subsystem 112 may include one or more video segments held on removable storage media and/or storage media integrated with video playing device 100. In some embodiments, one or more video segments may be obtained from a remote computing device (e.g., remote computing device 132) via communications network 134.

Instructions 114 may be executable by logic subsystem 110 to present an interaction hint with the video segment. The interaction hint may include one or more of a visual interaction hint and/or an audible interaction hint. The interaction hint may be presented with the video segment by displaying the video segment via display device 122, and by also displaying a visual representation of the interaction hint via display device 122 and/or by outputting an audible representation of the interaction hint via audio speaker 124. As a non-limiting example, an interaction hint may be displayed over a video segment or a portion of the video segment, the interaction hint may be displayed beside the video segment via the same display device, or the interaction hint may be displayed apart from the video segment via a different display device (e.g., via a cellular telephone or a tablet computer).

In some embodiments, the video segment may be obtained by video player device 100 in a format that does not include the interaction hint and/or in a format that is playable without the interaction hint. Instructions 114 of data-holding subsystem 112 may be executable by logic subsystem 110 to select one or more interaction hints to be presented with the video segment. Because video player device 100 is configured to apply the interaction hint to the presentation of the video segment, the video segment need not be prerecorded or otherwise modified (e.g., rescripted or recoded) from its original form to include the interaction hint prior to being received by the video player device. Hence, video segments that do not include and/or are capable of being played without interaction hints may be presented by video player device 100 with one or more interaction hints.

In some embodiments, instructions 114 may be executable by logic subsystem 110 to select or vary an interaction hint to be presented with the video segment based, at least in part, on a parameter of the video segment. Some video segments may include metadata that indicates a particular class or type of video segment with which certain types of interaction hints are to be presented. For example, video segments relating to an event (e.g., sporting event, concert, etc.) may be presented with an interaction hint that enables a user to update a calendar item corresponding to a date of the event, schedule an SMS reminder of the event to be delivered to a mobile device associated with a user profile, or that enables a user to publish the event to a user profile in a social networking environment that is accessible by one or more other users. As another example, video segments relating to a product or service may be presented with an interaction hint that enables a user to send an email to an email address associated with the user that includes additional product or service information, coupons for savings on such products or services, etc.

In some embodiments, instructions 114 may be executable by logic subsystem 110 to obtain an instruction set to be applied to the video segment. One or more interaction hints to be presented with a video segment may be selected or varied based, at least in part, on the instruction set. In some embodiments, the instruction set may be obtained as metadata of a video segment, or the instruction set may be provided separately from the video segment. For example, the instruction set may reside locally at video player device 100 as instructions 114 or data 116, or may be obtained from a remote computing device (e.g., remote computing device 132) via communications network 134. The instruction set may be used, for example, to implement a policy at video playing device 100 that causes video playing device 100 to include or exclude certain types of interaction hints from presentation with some or all of the video segments.

Instructions 114 may be executable by logic subsystem 110 to receive a user response to the interaction hint. The user response may be received at I/O device interface 118 via one or more input devices, such as optical sensor system 126, audio microphone 128, a touch-screen of display device 122, controller 120, or other suitable input device. Virtually any controller device may be used without departing from the scope of this disclosure (e.g., cellular telephone, tablet computer, personal computer, etc.).

In some embodiments, instructions 114 may be executable by the logic subsystem to select the interaction hint from one or more available interaction hints based, at least in part, on an input device communicating with the video playing device. Each of the one or more available interaction hints may correspond to different input modalities compatible with different input devices. For example, video playing device 100 may be configured to detect one or more input devices via which a user response may be received, and may select or vary the interaction hint presented based on the one or more detected input devices.

As a non-limiting example, instructions 114 may be executable by the logic subsystem 110 to present an interaction hint via display device 122 and/or audio speaker 124 indicating a physical act to be performed by a user, and to receive a user response via one or more optical sensors of optical sensor system 126. For example, a physical act of the user may include the user gesturing, moving, or positioning his or her body in a particular manner. A user may, for instance, gesture with his or her hands or arms, jump up and down, turn his or her body, move his or her body side-to-side or forward-to-back, or remain stationary in a particular position for a threshold period of time.

As another non-limiting example, instructions 114 may be executable by logic subsystem 110 to present an interaction hint via display device 122 and/or audio speaker 124 indicating a sound to be generated by a user, and to receive a user response via microphone 128. For example, a user may speak a particular word or phrase, or may produce a particular sound with his or her body (e.g., clapping, jumping, cheering, etc.), or may produce a particular sound via a physical implement such as a musical instrument or other suitable physical item.

As yet another non-limiting example, instructions 114 may be executable by logic subsystem 110 to present an interaction hint via display device 122 and/or audio speaker 124 indicating one or more control actions to be performed by a user via controller 120, and to receive a user response via controller 120. For example, the interaction hint may indicate that a user is to press a particular button or series of buttons on the controller.

Instructions 114 may be executable by logic subsystem 110 to, responsive to the user response, automatically update and/or send a message directing a local application or service and/or a remote computing device (e.g., remote computing device 132) to update information associated with a user profile without interrupting presentation of the video segment. In some embodiments, the user profile information updated responsive to the user response may include information relating to the video segment. At least some of this information may be included with or indicated by metadata of the video segment, including hyperlinks, telephone numbers, email addresses, etc.

For example, instructions 114 may be executable by logic subsystem 110 to automatically send a message directing remote computing device 132 to update information associated with the user profile within a social networking environment accessible by one or more other users. Such information may include a list of contacts, a list of favorites, bookmarks, a list of likes or dislikes, a list of events, an entry to an online journal, blog, or micro-blog post, etc. For example, a hyperlink relating to the video segment presented with the interaction gesture may be posted to a user profile responsive to a user providing a particular user response. As another example, a user's social network site or "wall" (i.e., user profile or a portion thereof) may be automatically updated with an announcement pertaining to the video content—e.g., "User A "likes" Video Segment X." As another example, an announcement automatically may be posted to a user's micro-blog (i.e., user profile or portion thereof)—e.g., "User A is watching Video Segment X and wants you to see it."

As another example, video player device 100 may send a message directing remote computing device 132 to update information associated with the user profile including a calendar item, or to schedule a Short Message Service (SMS) reminder of the event to be delivered to a mobile device associated with the user profile.

Some updates to information associated with a user profile may be performed locally at video playing device 100. In some embodiments, video player device 100 may include recording capability to enable a user to provide a user response to an interaction hint to bookmark, record, or schedule to record a media presentation at video playing device 100 (or at remote computing device 132). As another example, a user may provide a user response to an interaction hint to be presented with a graphical representation of a map by video player device 100 upon which a geographic location relating to the video segment presented with the interaction hint may be identified.

In some embodiments, instructions 114 may be executable by logic subsystem 110 to automatically send the message as an email message to an email address associated with the user profile or associated with the video segment (e.g., as indicated by metadata of the video segment), or to any suitable destination on behalf of the user associated with the user profile.

In some embodiments, instructions 114 may be executable by logic subsystem to automatically present additional information associated with the video segment responsive to the user response without interrupting presentation of the video segment. For example, the additional information may be presented beside or overlaid onto the video segment. In at least some embodiments, presentation of the interaction hint may be discontinued by video playing device 100 responsive to the user response.

In some embodiments, instructions 114 may be executable by logic subsystem 110 to compare a user response to a condition for determining whether the user response satisfies the interaction hint presented with the video segment. For example, instructions 114 may include a voice module and/or a gesture module for evaluating user responses received via microphone 128 and/or optical sensor system 126, respectively.

In some embodiments, instructions 114 may be executable by logic subsystem 110 to select or vary the condition to be satisfied by the user response based, at least in part, on an instruction set. For example, as previously discussed, video playing device 100 may obtain an instruction set from a remote computing device via a communications network, or locally from data-holding subsystem 112. The instruction set may be used, for example, to implement a policy at video playing device 100 that causes video playing device 100 to include or exclude certain types of user responses from satisfying the interaction hint presented with the video segment.

Figure 2:
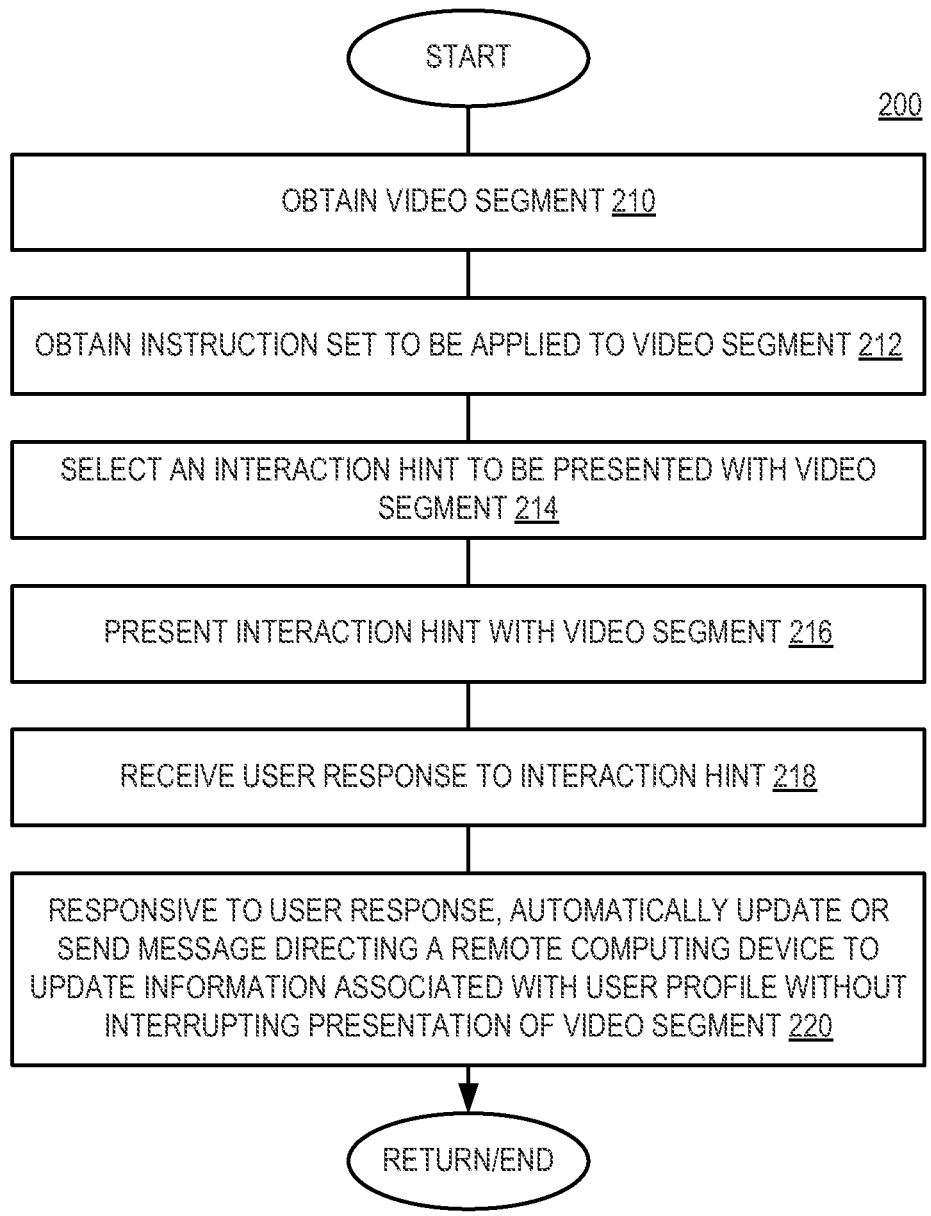
FIG. 2 is a flow diagram depicting an example method for a video playing device according to one disclosed embodiment.

FIG. 2 is a flow diagram depicting an example method 200 for a video playing device according to one disclosed embodiment. As a non-limiting example, method 200 may be implemented by a computing device such as previously described video playing device 100 of FIG. 1.

At 210, the method may include obtaining a video segment. The video segment may be obtained from a local source (e.g., removable or integrated storage media) or may be obtained from a remote source via a communications network. The video segment may include a video advertisement segment in some embodiments.

At 212, the method may include obtaining an instruction set to be applied to the video segment. The instruction set may be obtained from a local source (e.g., removable or integrated storage media) or may be obtained from a remote source via a communications network. The instruction set may be included as metadata accompanying the video segment obtained at 210 in some embodiments.

At 214, the method may include selecting an interaction hint to be presented with the video segment from one or more available interaction hints. The interaction hint may include a visual interaction hint, an audible interaction hint, or a combination thereof.

In some embodiments, selecting the interaction hint may be based, at least in part, on a parameter of the video segment obtained at 210 and/or on the instruction set obtained at 212. In some embodiments, selecting the interaction hint may be based, at least in part, on an input device communicating with the video playing device. When a plurality of different interaction hints are available for selection, each available interaction hint may correspond to an input modality compatible with a particular input devices. Accordingly, the interaction hint selected at 214 for presentation with the video segment may be selected or varied based, at least in part, on a parameter of the video segment, the instruction set, and/or the input device communicating with the video playing device.

At 216, the method may include presenting an interaction hint with the video segment. In some embodiments, the video segment includes a video advertisement segment, and the method at 216 may include presenting the video advertisement segment during an advertisement slot of a media presentation. As previously discussed, the video segment may be playable without the interaction hint and/or may not include the interaction hint. Hence, the video segment need not be prerecorded or otherwise modified to include the interaction hint prior to being obtained at 210.

The interaction hint may be presented with the video segment by displaying the video segment and a visual representation of the interaction hint via a display device. Alternatively or additionally, an audible representation of the interaction hint may be presented with the video segment by outputting the audible representation via an audio speaker. In some embodiments, an interaction hint may be displayed over a video segment or a portion of the video segment, may be displayed beside the video segment (e.g., as a ticker) via the same display device, or may be displayed with the video segment via a different display device than the video segment.

At 218, the method may include receiving a user response to the interaction hint. The user response may be received via one or more of a microphone as an audible sound produced by a user, one or more optical sensors as a physical movement (e.g., gesture) or positioning of a user, or a controller as one or more control actions performed by a user.

In some embodiments, the method at 218 may further include receiving the user response via one or more optical sensors, and the method at 214 may further include presenting the interaction hint indicating a physical act to be performed by a user to initiate an update, for example, by sending a message to a remote computing device.

In some embodiments, the method at 218 may further include receiving the user response via a microphone, and the method at 214 may further include presenting the interaction hint indicating a sound to be generated by a user.

In some embodiments, the method at 218 may further include receiving the user response via a controller, and the method at 214 may further include presenting the interaction hint indicating one or more control actions to be performed by a user via the controller.

At 220, the method may include, responsive to the user response, automatically updating (e.g., locally) or sending a message directing a remote computing device to update information associated with a user profile without interrupting presentation of the video segment. In some embodiments, the method at 220 may further include determining whether the user response satisfies a condition associated with the interaction hint for updating or sending a message directing a remote computing device to update information.

Any suitable information may be updated responsive to a user response. The information at a user profile may be updated to include information relating to the video segment presented with the interaction hint. For example, the method at 220 may include directing a remote computing device to update information associated with a user profile within a social networking environment accessible by one or more other users. As one example, the user profile may be updated to include a hyperlink to the video segment or to additional information relating to the video segment.

As another example, the method at 220 may include updating information associated with the user profile including a calendar item, an SMS reminder queue, or a contact list. As yet another example, the method at 220 may include sending the message to the remote computing device as an email message to an email address associated with the user profile or associated with the video segment. For example, an email address associated with a user profile may be sent an email message containing a coupon for a product or service relating to the video segment.

Furthermore, in some embodiments, the method at 220 may include, responsive to the user response, automatically presenting additional information associated with the video segment without interrupting presentation of the video segment. For example, additional information relating to the video segment may be presented with or alongside the video segment.

Figure 3:
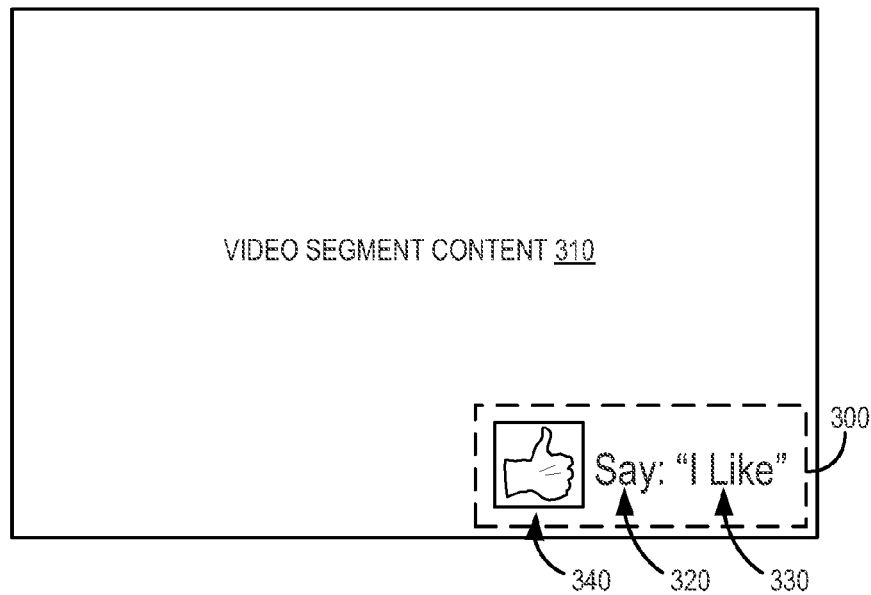
FIG. 3 is a schematic diagram depicting an example interaction hint presented with video segment content via a graphical display device according to one disclosed embodiment.

FIG. 3 is a schematic diagram depicting an example interaction hint 300 presented with video segment content 310 via a graphical display device according to one disclosed embodiment. Interaction hint 300 includes at least a visual interaction hint in the particular example of FIG. 3. However, an audible interaction hint may be presented in addition to or as an alternative to the visual interaction hint. In FIG. 3, interaction hint 300 indicates a physical act to be performed by a user or a sound to be generated by a user, for example, to initiate an update of information associated with a user profile.

In some embodiments, interaction hint 300 may include a number of indicator elements, such as an action type indicator 320, a condition indicator 330, and an information type indicator 340. For example, action type indicator 320 includes the indicator element: [Say:] in written form to indicate to a user that the user should say or speak a command to trigger the response. Condition indicator 330, for example, includes the indicator element: ["I Like"] in written form to indicate to a user what the user is to say or speak. Information type indicator 340, for example, includes an indicator element representing a thumb-up in symbolic form to indicate to a user the type of information that will be updated responsive to the user response.

It is to be appreciated that an indicator element may be presented in any suitable form, including a written form, a symbolic form, and/or an audible form. For example, instead of or in addition to the indicator element [Say:] being displayed in written form, the indicator element may be displayed in symbolic form (e.g., a symbol of a mouth imitating a speaking motion) and/or may be presented in an audible form via an audio speaker. A user response to interaction hint 300 that includes a user saying the phrase "I Like" may be received via a microphone, for example.

Figure 4:
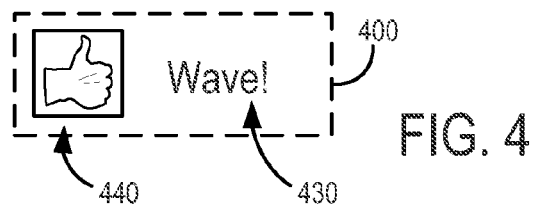
FIG. 4 is a schematic diagram depicting another example interaction hint according to one disclosed embodiment.

FIG. 4 is a schematic diagram depicting another example interaction hint 400 according to one disclosed embodiment. Interaction hint 400 includes a condition indicator 430 that includes the indicator element: ["Wave!"] in written form to indicate to a user that the user is to perform a waving motion or gesture with his or her hand. A user response to interaction hint 400 that includes a user waving his or her hand may be received via one or more optical sensors, for example. Information type indicator 440 again includes an indicator element representing a thumbs-up in symbolic form to indicate to a user the type of information that will be updated in response to the user response. For example, the thumbs-up symbol may indicate that information relating to the video segment is to be added to a favorite list of a user profile. An action type indicator is not included as part of interaction hint 400 in this particular example. However, the action type may be inferred by the user based on the content of condition indicator 430. Hence, one or more indicator elements may be omitted from the interaction hint in some embodiments, or other types of indicator elements may be presented.

Figure 5:
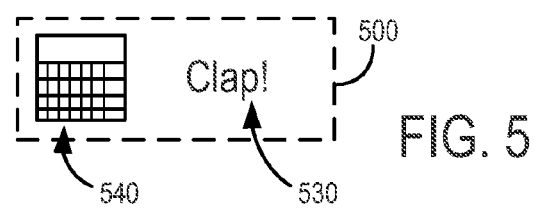
FIG. 5 is a schematic diagram depicting another example interaction hint according to one disclosed embodiment.

FIG. 5 is a schematic diagram depicting another example interaction hint 500 according to one disclosed embodiment. Interaction hint 500 includes a condition indicator 530 that includes the indicator element: ["Clap!"] in written form to indicate to a user that the user is to perform a clapping action with his or her hands to produce a clapping sound. A user response to interaction hint 500 that includes a user performing a clapping motion to produce a clapping sound may be received via one or more optical sensors and/or via a microphone. Information type indicator 540 includes an indicator element representing a calendar in symbolic form to indicate to a user that the type of information that will be updated will include a calendar item, for example.

Figure 6:
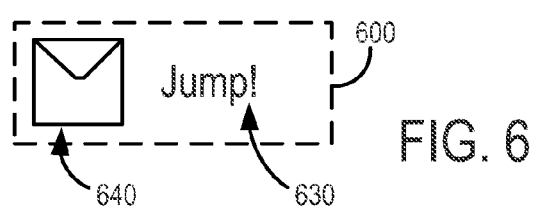
FIG. 6 is a schematic diagram depicting another example interaction hint according to one disclosed embodiment.

FIG. 6 is a schematic diagram depicting yet another example interaction hint 600 according to one disclosed embodiment. Interaction hint 600 includes a condition indicator 630 that includes the indicator element: ["Jump!"] in written form to indicate to a user that the user is to perform a jumping action with his or her body. A user response to interaction hint 600 that includes a user performing the jumping action may be received via one or more optical sensors, for example. Information type indicator 640 includes an indicator element representing a mail item in symbolic form to indicate to a user that the type of information that will be updated will include an email sent to particular email address on behalf of or addressed to the user associated with the user profile.

Referring again to FIG. 1, optical sensor system 126 may include a depth camera operatively connected to video playing device 100 via one or more sensor inputs. The depth camera may be capable of observing a scene including one or more viewers. The depth camera may be used to identify, monitor, and/or track viewers within a scene.

Figure 7:
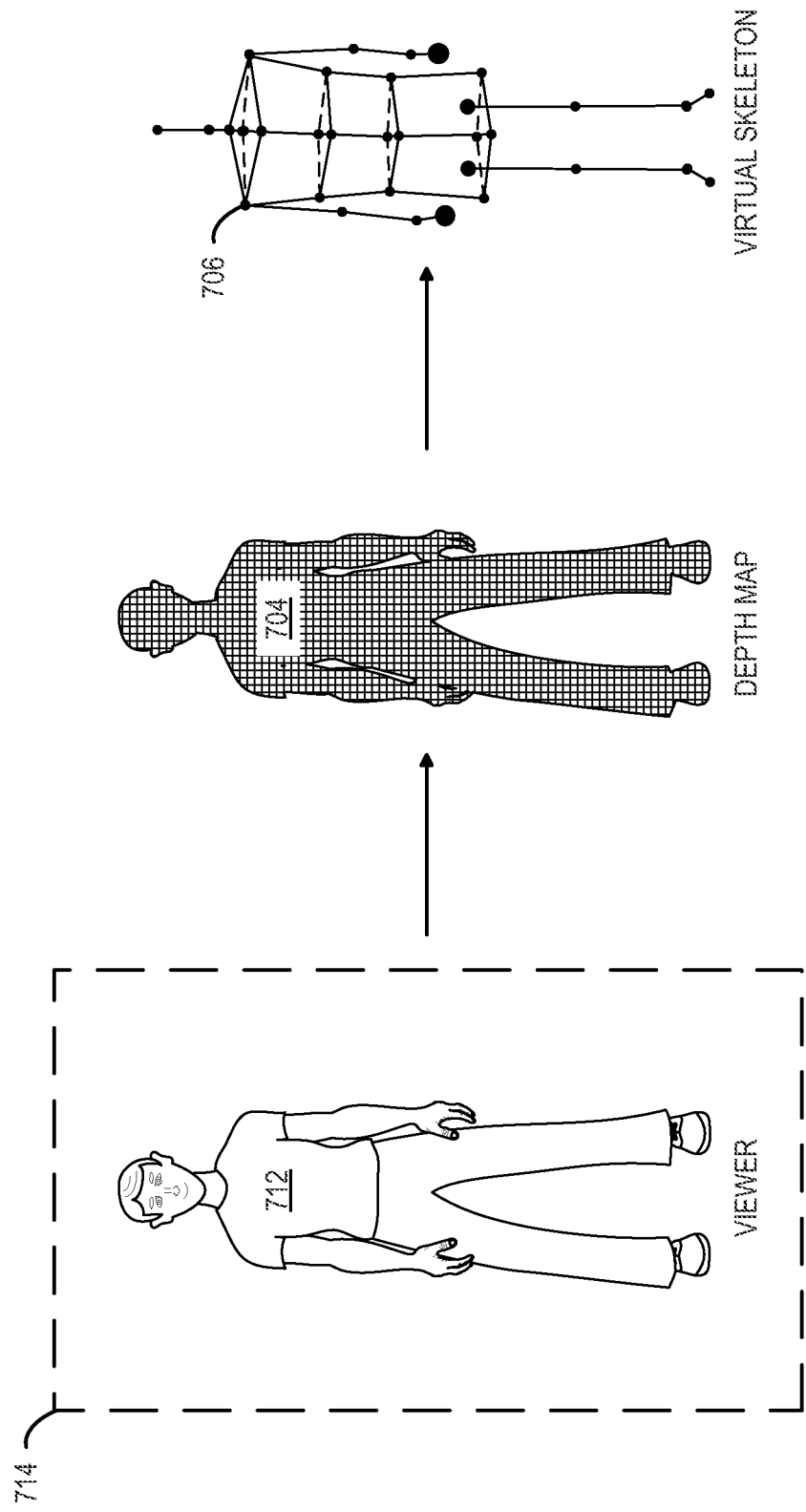
FIG. 7 shows a simplified processing pipeline in which an observer within a scene may be modeled according to one disclosed embodiment.

FIG. 7 shows a simplified processing pipeline in which a viewer 712 within a scene may be modeled. It is to be appreciated that a processing pipeline may include additional steps and/or alternative steps than those depicted in FIG. 7 without departing from the scope of this disclosure.

As shown in FIG. 7, the three-dimensional appearance of viewer 712 and the rest of observed scene 714 may be imaged by a depth camera. The depth camera may determine, for each pixel, the three dimensional depth of a surface in the observed scene 714 relative to the depth camera. Virtually any depth finding technology may be used without departing from the scope of this disclosure. Non-limiting examples of depth cameras include time of flight depth cameras and structured light depth cameras.

The three dimensional depth information determined for each pixel may be used to generate a depth map 704. Such a depth map may take the form of virtually any suitable data structure, including but not limited to a matrix that includes a depth value for each pixel of the observed scene. In FIG. 7, the depth map 704 is schematically illustrated as a pixilated grid of the silhouette of the viewer 712. This illustration is for simplicity of understanding, not technical accuracy. It is to be understood that a depth map generally includes depth information for all pixels, not just pixels that image the viewer 712.

A virtual skeleton 706 may be derived from the depth map 704 to provide a machine readable representation of the viewer 712. In other words, the virtual skeleton 706 is derived from depth map 704 to model the viewer 712. The virtual skeleton 706 may be derived from the depth map 704 in any suitable manner. In some embodiments, one or more skeletal fitting algorithms may be applied to the depth map. The present disclosure is compatible with virtually any skeletal modeling techniques.

The virtual skeleton 706 may include a plurality of joints, and each joint may correspond to a portion of the viewer 712. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

The virtual skeleton 706 may be used to assess the posture, pose, and/or gestures of a viewer. For example, if an interaction hint includes a condition indicator to wave, the virtual skeletons from one or more frames of captured depth video may be analyzed to determine if a user's hand and arm joints move in a waving motion.

Referring again to FIG. 1, it is to be appreciated that logic subsystem 110 may include one or more processors configured to execute software instructions. Additionally or alternatively, logic subsystem 110 may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 112 may include one or more physical, non-transitory, devices configured to hold data 116 and/or instructions 114 executable by logic subsystem 110 to implement the herein described methods and processes. When such methods and processes are implemented, the state of data-holding subsystem 112 may be transformed (e.g., to hold different data).

Data-holding subsystem 112 may include removable media and/or built-in devices. Data-holding subsystem 112 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others.

Data-holding subsystem 112 may include devices with one or more of the following characteristics: volatile, nonvolatile, dynamic, static, read/write, read-only, random access, sequential access, location addressable, file addressable, and content addressable. In some embodiments, logic subsystem 110 and data-holding subsystem 112 may be integrated into one or more common devices, such as an application specific integrated circuit or a system on a chip.

It is to be appreciated that the example data-holding subsystem described herein includes one or more physical, non-transitory devices. In contrast, in some aspects of instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of a video playing device that is implemented to perform one or more particular functions. In some cases, such a module, program, or engine may be instantiated via the logic subsystem executing instructions held by the data-holding subsystem. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A video playing device, comprising:
a logic subsystem;
a data-holding subsystem holding instructions executable by the logic subsystem to:
obtain a video segment;
recognize a classification of the video segment;
recognize a user-input modality selected from a plurality of user-input modalities;
select an interaction hint from a plurality of different interaction hints for performing different actions based on the recognized classification and the recognized user-input modality;
present the interaction hint selected from the plurality of different interaction hints with the video segment;
receive a user response to the interaction hint, the user response provided in accordance with the recognized user-input modality; and
responsive to the user response, automatically send a message directing a remote computing device to update information associated with a user profile without interrupting presentation of the video segment.

2. The video playing device of claim 1, wherein the video segment is playable without the interaction hint.

3. The video playing device of claim 1, wherein the interaction hint includes one or more of a visual interaction hint and/or an audible interaction hint.

4. The video playing device of claim 1, wherein the video segment includes a video advertisement segment, and wherein the instructions are executable by the logic subsystem to present the video advertisement segment during an advertisement slot of a media presentation.

5. The video playing device of claim 1, wherein the instructions are executable by the logic subsystem to:

receive the user response via one or more optical sensors; and
present the interaction hint indicating a physical act to be performed by a user to initiate sending of the message.

6. The video playing device of claim 1, wherein the instructions are executable by the logic subsystem to:
receive the user response via a microphone; and
present the interaction hint indicating a sound to be generated by a user to initiate sending of the message.

7. The video playing device of claim 1, wherein the instructions are executable by the logic subsystem to:
receive the user response via a controller; and
present the interaction hint indicating one or more control actions to be performed by a user via the controller to initiate sending of the message.

8. The video playing device of claim 1, wherein the instructions are executable by the logic subsystem to:
automatically send the message directing the remote computing device to update information associated with the user profile within a social networking environment accessible by one or more other users.

9. The video playing device of claim 1, wherein the instructions are executable by the logic subsystem to:
automatically send the message directing the remote computing device to update information associated with the user profile including a calendar item, bookmark item, or a contact list.

10. The video playing device of claim 1, wherein the instructions are executable by the logic subsystem to:
automatically send the message as an email message to an email address associated with the user profile or the video segment.

11. The video playing device of claim 1, wherein the interaction hint includes an action type indicator to indicate an act or action to be performed by a user, a condition indicator to indicate a condition of the act or action to satisfy the interaction hint, and an information type indicator to indicate a type of information to be updated responsive to the user response.

12. The video playing device of claim 1, wherein the instructions are executable by the logic subsystem to:
vary the interaction hint presented with the video segment based, at least in part, on a parameter of the video segment.

13. The video playing device of claim 1, wherein the instructions are executable by the logic subsystem to:
obtain an instruction set to be applied to the video segment; and
based, at least in part, on the instruction set, vary one or more of: the interaction hint presented with the video segment, or
a condition to be satisfied by the user response for automatically sending the message.

14. The video playing device of claim 1, wherein the instructions are executable by the logic subsystem to:
determine whether or not user interaction is enabled for the video segment based on the classification of the video segment;
if user interaction is enabled for the video segment,
select the interaction hint from the plurality of different interaction hints for performing different types of actions based on the recognized content-type classification and the recognized user-input modality,
present the selected interaction hint with the video segment,
receive the user response to the interaction hint, and
responsive to the user response, automatically send the message directing the remote computing device to update information associated with a user profile without interrupting presentation of the video segment; and if user interaction is not enabled for the video segment, present the video segment without an interaction hint.

15. A method for a video playing device, comprising:
obtaining a video segment;
recognizing a classification of the video segment;
recognizing a user-input modality selected from a plurality of user-input modalities;
selecting an interaction hint from a plurality of different interaction hints for performing different actions based on the recognized classification and the recognized user-input modality;
presenting, via the video playing device, the interaction hint selected from the plurality of different interaction hints with the video segment;
receiving a user response to the interaction hint, the user response provided in accordance with the recognized user-input modality; and
responsive to the user response, automatically sending a message to update information associated with a user profile without interrupting presentation of the video segment on the video playing device.

16. The method of claim 15, wherein the video segment is playable without the interaction hint; and
wherein the interaction hint includes one or more of a visual interaction hint or an audible interaction hint.

17. The method of claim 15, wherein the video segment includes a video advertisement segment; the method further comprising, presenting the video advertisement segment during an advertisement slot of a media presentation.

18. The method of claim 15, further comprising:
receiving the user response via one or more optical sensors; and
presenting the interaction hint indicating a physical act to be performed by a user to initiate sending of the message.

19. The method of claim 15, further comprising:
automatically sending the message to a remote computing device to update information associated with a user profile within a social networking environment accessible by one or more other users.

20. A video playing device, comprising:
a logic subsystem;
a data-holding subsystem holding instructions executable by the logic subsystem to:
obtain a video advertisement segment;
recognize a classification of the video segment;
recognize a user-input modality selected from a plurality of user-input modalities;
select an interaction hint from a plurality of different interaction hints for performing different actions based on the recognized classification and the recognized user-input modality;
present the interaction hint selected from the plurality of different interaction hints with the video advertisement segment, the interaction hint indicating a physical act to be performed by a user;
receive a user response to the interaction hint via one or more sensors indicating one or more physical acts performed by the user in accordance with the recognized user-input modality; and
responsive to the user response, automatically update information associated with a user profile of the user without interrupting presentation of the video advertisement segment.

\* \* \* \* \*